United States Patent Office 3,311,570
Patented Mar. 28, 1967

3,311,570
POLYMERS AND COPOLYMERS OF 1,1,1-TRI-HALO-3,4-EPOXYBUTANES
Edwin J. Vandenberg, Wilmington, Del., assignor to Hercules Incorporated, a corporation of Delaware
No Drawing. Filed Mar. 27, 1964, Ser. No. 356,012
11 Claims. (Cl. 260—2)

This application is a continuation-in-part of my application Ser. No. 812,079, filed May 11, 1959, now U.S. Patent No. 3,135,705.

This invention relates to polymers derived from 1,1,1-trihalo-3,4-epoxybutanes.

In accordance with this invention, it has been discovered that 1,1,1-trihalo-3,4-epoxybutanes can be homopolymerized to yield essentially linear polyethers which can be either amorphous polymers or crystalline polymers having outstanding properties. Further, and in accordance with this invention, it has been determined that 1,1,1-trihalo-3,4-epoxybutanes can be copolymerized with other monomers (to be detailed more fully hereinafter) to provide essentially linear polyether polymers having excellent physical properties.

Suitable 1,1,1-trihalo-3,4-epoxybutanes that can be polymerized in accordance with this invention include 1,1,1-trichloro-3,4-epoxybutane, 1,1,1-trifluoro-3,4-epoxybutane, 1,1,1-tribromo-3,4-epoxybutane, and 1,1,1-triiodo-3,4-epoxybutane.

The novel polymers and copolymers of this invention that are of high molecular weight can be fabricated into films, fibers, molded articles, and the like which possess good physical properties. The high molecular weight polymers and copolymers are adapted particularly to the manufacture of articles that have good flame resistance properties, that is, the articles will not support combustion.

The homopolymers and copolymers of lower molecular weight, as well as the higher molecular weight polymers and copolymers, have utility as additives for plastics, elastomers, waxes, protective coatings, and the like to decrease substantially the inflammability thereof and to improve the solvent resistance thereof.

These new homopolymers and copolymers can be crosslinked with diamines, amines plus sulfur, and the like. Further, the polymers and copolymers can be plasticized, if desired, with plasticizers commonly used for the plasticization of poly(vinyl chloride) such, for example, as dioctyl phthalate.

The essentially amorphous products are especially desirable in many cases since they are more compatible with other plastics, elastomers, and the like. The elastomeric, amorphous products are very useful for vulcanized products because of their excellent solvent resistance, good ozone resistance, and good heat stability.

The crystalline products are useful in areas where better physical properties at elevated temperatures in combination with flame resistance, solvent resistance, and the like, are desired.

Monomers that can be copolymerized with the above-mentioned 1,1,1-trihalo-3,4-epoxybutanes include other dissimilar epoxides. Epoxides wherein the epoxy group is an oxirane ring are particularly suitable for the preparation of copolymers of good physical properties. Such epoxides include ethylene oxide, mono-substituted ethylene oxides having the formula

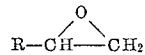

and symmetrically di-substituted ethylene oxides having the formula

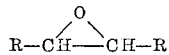

In the above formulas, R is a hydrocarbon radical such as alkyl, alkenyl, aryl, cycloalkyl, haloalkyl, alkyloxy alkyl, alkenyloxy alkyl, aryloxy alkyl, and the like.

Exemplary of the epoxides that can be copolymerized with 1,1,1 - trihalo - 3,4 - epoxybutanes are the alkylene oxides such as ethylene oxide, propylene oxide, 1-butene oxide, cis and trans 2-butene oxides, isobutylene oxide, 1-hexene oxide, and substituted alkylene oxides such as cyclohexene oxide, epoxycyclooctene, styrene oxide, the alkyl glycidyl ethers such as methyl glycidyl ether, ethyl glycidyl ether, methylethyl glycidyl ether, and butyl glycidyl ether, glycidyl ethers of phenol, bisphenol, and the like, unsaturated epoxides such as vinyl cyclohexene mono- and di-oxides, butadiene monoxides, allyl glycidyl ether, allylphenyl glycidyl ether, crotylphenyl glycidyl ether, and the like. Other halogen-containing epoxides such as epichlorohydrin, epibromohydrin, epifluorohydrin, perfluoropropylene oxide, perfluoroethylene oxide, the cis- and trans-1,4-dihalo-2,3-epoxybutanes, and the like, can be copolymerized with the 1,1,1-trihalo-3,4-epoxybutanes.

The copolymers derived from 1,1,1-trihalo-3,4-epoxybutanes and other epoxides will usually be comprised of, by weight, from about 3% to 98%, preferably from about 20% to 95%, and more preferably from about 30% to 90% of a 1,1,1-trihalo-3,4-epoxybutane, the balance being at least one of the other epoxides.

The copolymers derived from 1,1,1-trihalo-3,4-epoxybutanes and another epoxide will range from amorphous or crystalline hard solids at room temperature to essentially amorphous rubbery materials at room temperature. These copolymers can be cross-linked in the same manner described above for the cross-linking of homopolymers of 1,1,1-trihalo-3,4-epoxybutanes. The hard, solid copolymers, generally the amorphous or crystalline products comprised of, by weight, from about 85% to 98% of a 1,1,1-trihalo-3,4-epoxybutane, can be fabricated into films, fibers, molded articles, and the like of good physical properties. The elastomeric, essentially amorphous copolymers will usually be comprised of, by weight, from about 20% to 97%, preferably from about 25% to 80%, and more preferably from about 30% to 70% of a flexibilizing epoxide and the balance a 1,1,1-trihalo-3,4-epoxybutane. Such copolymers are useful as vulcanized elastomers, the more preferred range being especially useful because of superior solvent resistance and flame resistance, or the ease with which they can be modified by adding known flame-retardant additives to provide flame-retardant products. The elastomeric copolymers and terpolymers containing an unsaturated epoxide (from about 1% to 25%) are especially useful since they can be vulcanized with conventional sulfur curatives.

The polymers of this invention will have a weight average molecular weight of at least about 50,000, and preferably of the order of about 100,000 and higher. The RSV of the polymers will be greater than about 0.2 and preferably above 0.5. The most preferred polymers will have an RSV of greater than about 1.0.

Any organoaluminum compound reacted with water can be used as the catalyst for the homopolymerization and copolymerization of 1,1,1-trihalo-3,4-epoxybutanes in accordance with this invention.

Exemplary of the organoaluminum compounds that can be used are trialkylaluminum compounds, tricycloalkylaluminum compounds, triarylaluminum compounds, dialkylaluminum hydrides, monoaluminumalkyl dihydrides, dialkylaluminum halides, monoalkylaluminum dihalides, dialkylaluminum alkoxides, monoalkylaluminum dialkoxides, and complexes of these compounds such, for example, as the alkali metal aluminum tetraalkyls such as lithiumaluminum tetraalkyl, and the like.

Thus, these compounds can be defined as any aluminum compound containing an aluminum to carbon bond or having the formula $AlRX_2$ where R is any alkyl, cycloalkyl, aryl, or alkaryl radical and X can be alkyl, such as methyl, ethyl, propyl, isopropyl, n-butyl, isobutyl, amyl, hexyl, octyl, and decyl; aryl such as phenyl, tolyl, and halophenyl; cycloalkyl such as cyclohexyl and cyclopentyl; hydrogen; halogen, such as chlorine, fluorine, or bromine; alkoxy, such as methoxy, ethoxy, isopropoxy, butoxy, isobutoxy, and tert-butoxy; and the radical

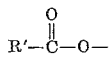

such as acetoxy, stearoxy, and benzoxy.

Another group of these aluminum compounds that can be reacted with water are those formed by reacting an aluminum alkyl with a polyol such as ethylene glycol, propylene glycol, glycerin, pentaerythritol, sorbitol, catechol, and resorcinol, in which case the X in the above formula would be $-O-R''-O-AlRX$, where R'' is alkylene, phenylene, and the like. In some cases it may be desirable to complex the organoaluminum compound with a complexing agent such as tetrahydrofuran as, for example, triisobutylaluminum complexed with a molar amount of tetrahydrofuran.

Other types of organoaluminum compounds that can be reacted with water and used as the catalyst in accordance with this invention are the alkylaluminum chelates and alkylaluminum enolates such as those formed by reacting a trialkylaluminum or dialkylaluminum hydride such as triethylaluminum, triisobutylaluminum, diisobutylaluminum hydride, and the like, with an organic compound that is capable of forming a ring by coordination with its unshared electrons and the aluminum atom. Preferably, these chelating agents are characterized by two functional groups, one of which is a —OH group or —SH group such as, for example, a hydroxyl, or an enol of a ketone, sulfoxide or sulfone, an OH of a carboxyl group, and the like, which —OH or —SH group interacts with the trialkylaluminum or dialkylaluminum hydride to form a conventional, covalent aluminum-oxygen bond or aluminum-sulfur bond. The second functional group is one which contains an oxygen, nitrogen, or sulfur atom that forms a co-ordinate bond with the aluminum.

Examples of groups containing such oxygen, nitrogen, or sulfur atoms are

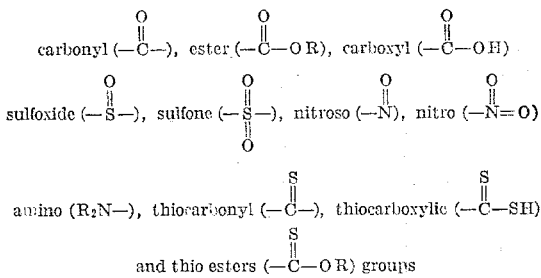

The ring size formed with the aluminum by the chelating agent preferably contains five or six atoms including the aluminum, but rings with four and seven atoms are also operable.

The amount of chelating agent reacted with the alkylaluminum compound will generally be within the range of from about 0.01 mole to about 1.5 moles of chelating agent per mole of aluminum and preferably will be from about 0.1 to about 1 mole per mole of aluminum alkyl.

Exemplary of the chelating agents that can be reacted with a trialkylaluminum or dialkylaluminum hydride and the chelate then reacted with water to produce the catalysts for use in this invention are diketones, such as acetylacetone, trifluoroacetylacetone, acetonylacetone, benzoylacetone, furoylacetone, thenoyltrifluoroacetone, dibenzoyl methane, 3-methyl-2,4-pentane-dione, 3-benzyl-2,4-pentane-dione, and the like; ketoacids, such as acetoacetic acid; ketoesters, such as ethyl acetoacetate; ketoaldehydes, such as formylacetone; hydroxy-ketones, such as hydroxyethyl methyl ketone, hydroxyacetone, o-hydroxyacetophenone, and 2,5-dihydroxy-p-benzoquinone; hydroxyaldehydes, such as salicylaldehyde; hydroxy esters, such as ethyl glycolate, 2-hydroxyethyl acetate; dicarboxylic acids and their esters, such as oxalic acid and malonic acid, mono-esters of oxalic acid and mono- and di-esters of malonic acid; dialdehydes, such as malonaldehyde; alkoxyacids, such as ethoxyacetic acid; ketoximes, such as 2,3-butane-dione-monoxime; dialdehyde monoximes, such as glyoxal monoxime; hydroxamic acids, such as N-phenyl benzohydroxamic acid; dioximes, such as dimethyl glyoxime; nitro compounds, such as 1,3-nitroalcohols, 1,3-nitroketones, 2-nitroacetic acid; and nitroso compounds, such as 1,2-nitroso-oximes.

Chelating agents with two or more chelating functions can also be used, as, for example, 2,5-dihydroxy-p-benzoquinone, bis(1,3-diketones), such as $$(CH_3CO)_2CHCH(COCH_3)_2$$

$(CH_3CO)_2CH(CH_2)_nCH(COCH_3)_2$ where $n$ is 2, 6, or 10, bis(1,2-ketoximes), and bis(1,2-dioximes).

Regardless of the organoaluminum compound that is used, it should be reacted with water as set forth above in a molar ratio of from about 0.1 mole of water per mole of organoaluminum compound up to about 1.5 moles of water per mole of organoaluminum compound. Slightly higher amounts of water can be used, but at a ratio of about 2 moles of water to 1 mole of organoaluminum compound, there is little or no improvement over the use of no water in the polymerization system, and when the ratio of water to organoaluminum compound gets appreciably above 2:1, it has an adverse effect and the polymerization is retarded or otherwise adversely affected. Preferably, the molar ratio of water to organoaluminum compound will be in the range of from about 0.2:1 to about 1:1. The exact amount of water will depend to some extent on the organoaluminum compound, the specific monomer or monomers being polymerized, the diluent, the temperature, and the like.

Any desired procedure can be used for reacting the organoaluminum compound with the specified molar ratio of water. Generally better results are obtained if the organoaluminum compound and water are prereacted and the reaction product then added to the polymerization mixture. This can readily be done, and preferably is done, by adding the specified amount of water gradually to a solution of the organoaluminum compound in an inert diluent as, for example, a hydrocarbon diluent such as n-hexane, toluene, or an ether such as diethyl ether or a mixture of such diluents. It can also be done in the absence of a diluent. If a chelating agent is used, it can be added before or after reacting with water. The chelating agent and prereacted organoaluminum-water product can also be reacted in situ. These organoaluminum-water reaction products can be used immediately or aged or, if desired, heat-treated in some cases. Excellent results can be obtained also by reacting the organoaluminum compound with the water within the specified molar ratio in situ. This can be accomplished by adding the specified amount of water to the monomer or mixture of monomers being polymerized and then adding the organoaluminum compound, or the two can be added to the polymerization reaction mixture simultaneously. If desired, the organoaluminum-water reaction product can be used in combination with other organoaluminum compounds.

The exact nature of this reaction product of the organoaluminum compound with the above-specified amount of water is not known. As pointed out, the amount of water reacted with the organoaluminum compound is critical to produce the superior catalyst for the polymerization of the monomers in accordance with this invention. It is believed that a reaction rather than a complex formation takes place. Thus, when a trialkylaluminum compound is reacted with water, it has been found that a very rapid and complete reaction occurs to liberate 2 moles of alkane per mole of water. Thus, with triethylaluminum, 2 moles of ethane per mole of water are liberated. The products are believed to be organoaluminum oxide type compounds, such as

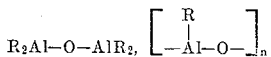

and the like. These compounds are probably somewhat associated in organic media. The most active or preferred catalyst species is probably the polymeric species where there is about one R group per Al. Regardless of what the theory is, the reaction product obtained when an organoaluminum compound is reacted with from about 0.1 mole to about 1.5 moles of water per mole of aluminum compound is an outstanding catalyst for use in this invention.

Any amount of the organoaluminum-water reaction product can be used to catalyze the polymerization process in accordance with this invention from a minor catalytic amount up to a large excess but, in general, will be within the range of from about 0.2 to 10 mole percent based on the monomer being polymerized and preferably will be within the range of from about 1 to about 5 mole percent based on the monomer being polymerized. The amount used depends in part on such factors as monomer purity, diluent purity, and the like, less pure epoxides and diluents requiring more catalyst to destroy reactive impurities. In order to decrease catalyst consumption, it is generally preferred that impurities such as carbon dioxide, oxygen, aldehydes, alcohols, and the like, be kept at as low a level as practical.

The polymerization reaction can be carried out by any desired means, either as a batch or continuous process with the catalyst added all at one time or in increments during the polymerization or continuously throughout the polymerization. If desired, the monomer can be added gradually to the polymerization system. It can be carried out as a bulk polymerization process, in some cases at the boiling point of the monomer (reduced to a convenient level by adjusting the pressure) so as to remove the heat of reaction. However, for ease of operation, it is more generally carried out in the presence of an inert diluent. Any diluent that is inert under the polymerization reaction conditions can be used as, for example, ethers such as the dialkyl, aryl, or cycloalkyl ethers as, for example, diethyl ether, dipropyl ether, diisopropyl ether; aromatic hydrocarbons such as benzene, toluene, and the like; or saturated aliphatic hydrocarbons and cycloaliphatic hydrocarbons such as n-heptane and cyclohexane; and halogenated hydrocarbons as, for example, chlorobenzene or haloalkanes such as methyl chloride, methylene chloride, chloroform, carbon tetrachloride, and ethylene dichloride. Obviously, any mixture of such diluents can be used and in many cases is preferable. For example, when saturated aliphatic hydrocarbons are used as the diluent, it is preferable, particularly if high molecular weight polymers are desired or if very little diluent is present, to use them in admixture with ethers. A complexing agent for the organoaluminum compound, such as ether and tetrahydrofuran, can be used and is particularly desirable in a bulk polymerization process.

The polymerization process in accordance with this invention can be carried out over a wide temperature range and pressure. Usually, it will be carried out at a temperature from about −80° C. up to about 250° C., preferably, from about −80° C. to about 150° C. and more preferably within the range of about −30° C. to about 100° C. Usually, the polymerization process will be carried out at autogenous pressure, but superatmospheric pressures up to several hundred pounds can be used if desired, and, in the same way, subatmospheric pressures can also be used.

The following examples will illustrate the preparation of the new polymers of this invention. All parts and percentages are by weight unless otherwise indicated.

The molecular weight of a polymer is shown by its reduced specific viscosity (RSV). The term "reduced specific viscosity" means the $\eta_{sp.}/c$, which was determined unless otherwise noted, on a 0.1% solution of the polymer in tetrachloroethane at 100° C.

The melting point, where given, was determined by differential thermal analysis, also referred to as DTA. The procedure for determining the melting point of a polymer by differential thermal analysis is described in Organic Analysis, vol. 4, by J. Mitchell, I. M. Koltoff, E. S. Proskauer, and A. Weisgerber, Interscience Publishers, New York, 1960. See particularly pages 372–383 of this reference.

The polymers obtained in the following examples were dried for 16 hours at 80° C. in vacuo.

*Example 1*

A catalyst solution was prepared by reacting 0.114 part of triethylaluminum in 1.4 parts of a 70:30 mixture of ether and n-heptane with 0.009 part of water (0.5 mole of water per mole of aluminum). The water was added slowly over a period of about 15 minutes during which time the reaction mixture was maintained at a temperature of about 0° C. The reaction mixture was then stirred for 1 hour during which time its temperature was maintained at about 0° C. Subsequently, there was added to the reaction mass 0.050 part of acetylacetone (0.5 mole of acetylacetone per mole of aluminum). The addition of the acetylacetone was accomplished over a period of about 10 minutes during which time the temperature of the mass was maintained at about 0° C. The mass was subsequently stirred at 0° C. for 15 minutes and then for 20 hours at room temperature (about 25° C.).

A polymerization vessel, free of air, was charged, under nitrogen, with 20 parts of dry toluene and 3 parts of 1,1,1-trichloro-3,4-epoxybutane. After equilibrating at 50° C., the above catalyst solution was injected into the vessel and the polymerization reaction allowed to proceed for 70 hours at 50° C. The reaction was then stopped by the addition to the vessel of 8 parts of anhydrous ethanol. The mixture was diluted with toluene, washed two times with a 3% aqueous solution of hydrogen chloride, then with water until neutral, then once with a 2% aqueous solution of sodium bicarbonate, and then three times with water. The toluene-insoluble portion of the reaction product was separated, washed twice with toluene and once with a 0.05% solution of Santonox in toluene, and then dried. Santonox is a proprietary designation for 4,4'-thiobis(6-tert-butyl-m-cresol). About 0.84 part of toluene-insoluble polymer was obtained. The polymer was a brittle solid and was insoluble in tetrachloroethane at room temperature. The polymer was crystalline by X-ray diffraction analysis, had a melting point of 170° C., and had an RSV of 0.21. Elemental analysis showed that the polymer contained 60.4% chlorine which agrees substantially with the theoretical value of 60.7% chlorine.

The toluene washes, except for the last, were combined, stabilized with Santonox equal to 0.5% based on the polymer, stripped and dried. This gave 0.40 part of a somewhat brittle, orientable film. The polymer was amorphous by X-ray diffraction analysis.

*Example 2*

Five parts of 1,1,1-trichloro-3,4-epoxybutane and 18.4 parts of toluene were mixed under nitrogen and with the temperature at 50° C., and there was added 0.10 part of triisobutylaluminum, which had been reacted with 0.5 mole (0.0045 part) of water per mole of aluminum in 0.7 part of a 50:50 mixture of diethyl ether and n-heptane at 20° C. The polymerization reaction was run for 19 hours at 50° C. and then stopped by adding 2 parts of anhydrous ethanol. The reaction mixture was treated and the polymer isolated in a manner similar to that described in Example 1. Monomer conversion to toluene-insoluble polymer was 4.2%. The toluene-insoluble polymer was crystalline by X-ray diffraction analysis, had an RSV of 0.34, and a melting point of 180° C.

Monomer conversion to toluene-soluble polymer was 14% (0.70 part). It was purified by dissolving in 43 parts of toluene, separating out the toluene-insoluble (0.045 part of brittle polymer), and then by precipitating with 5 volumes of methanol. The precipitate was separated out, washed twice with methanol, and once with a 0.05% solution of Santonox in methanol. The product, after drying, was 0.53 part of a hard, tough solid which had an RSV of 1.8 and was amorphous by X-ray diffraction analysis. Elemental analysis gave 28.16% carbon, 3.22% hydrogen, and 61.1% chlorine which agreed substantially with the theoretical values for $C_4Cl_3H_5O$ of 27.4% carbon, 2.88% hydrogen, and 60.7% chlorine.

*Example 3*

Example 2 was repeated with the exception that the catalyst used was prepared by reacting 0.4 part of triisobutylaluminum in 0.7 part of a 50:50 mixture of diethyl ether and n-heptane (0.5 molar concentration of aluminum) with 0.6 mole of water per mole of aluminum at 20° C. The polymerization reaction was run for 19 hours at 30° C. Monomer conversion to toluene-insoluble polymer was about 6.2%. The polymer was a white, brittle solid having an RSV of 2.7, and was crystalline according to X-ray diffraction analysis. Monomer conversion to toluene-soluble polymer was about 94%, and the polymer had an RSV of 1.4.

*Example 4*

Example 3 was repeated with the exception that the polymerization reaction was carried out at 0° C. for 96 hours and then stopped by the addition to the reaction mass of 2 parts of anhydrous ethanol. Monomer conversion to toluene-insoluble polymer was 38%, the polymer had an RSV of 1.9, and was amorphous by X-ray diffraction analysis. The polymer was molded at 180° C. to provide a clear, hard film. When molded on to aluminum, a hard, strongly adhering coating was obtained. The amount of monomer that was converted to toluene-soluble polymer was 52%, and the polymer had an RSV of 1.6. The toluene-soluble polymer was purified by the same procedure employed in Example 2. The amount of purified toluene-soluble polymer obtained indicated that 51% of the monomer was converted to this purified form. At 80° C. the polymer was of rubbery consistency. The purified toluene-soluble polymer had an RSV of 1.5, was amorphous by X-ray diffraction analysis, and elemental analysis gave 27.60% carbon, 3.14% hydrogen, and 60.8% chlorine. The polymer was compression molded at 100° C. for 3 minutes at 150 p.s.i. to give a colorless, hard, tough film. The film had a tensile strength of 5,000 p.s.i., an elongation of 3%, and a modulus of 298,000 p.s.i. The film was placed in contact with a flame and ignited. It was then promptly removed from the flame and it no longer continued to burn, indicating that the polymer is self-extinguishing.

*Example 5*

Example 4 was repeated except that there was used 2.8 parts of a catalyst solution that had been prepared by reacting 0.4 part of triisobutylaluminum with 0.5 mole of water per mole of aluminum in n-heptane at 0° C. About 18% of the monomer was converted to toluene-insoluble polymer which was a white solid, was crystalline by X-ray diffraction analysis, and had an RSV of 2.1. The polymer was molded at 180° C. to give a hard film. About 34% of the monomer was converted to toluene-soluble polymer which was a tacky, adhering mass having an RSV of 0.39.

*Example 6*

A polymerization vessel containing an atmosphere of nitrogen was charged with 36.6 parts of dry toluene, 5 parts of epichlorohydrin, and 5 parts of 1,1,1-trichloro-3,4-epoxybutane. A catalyst solution was prepared by reacting 0.80 part of triisobutylaluminum dissolved in 3.7 parts of diethyl ether and 1.5 parts of n-heptane with 0.6 mole of water per mole of aluminum. The solution had a 0.5 molar concentration of aluminum. About 5.7 parts of the catalyst solution is injected into the polymerization vessel and the polymerization reaction carried out at 0° C. After 5.5 hours the reaction was stopped by adding to the vessel 4 parts of anhydrous ethanol. It was precipitated with about 135 parts of n-heptane, and the insoluble product was collected, washed once with diethyl ether, washed with a 1% solution of hydrogen chloride in anhydrous ethanol, washed neutral with methanol, washed once with a 0.4% solution of Santonox in methanol, and dried. About 35% of the total monomers were converted to a tough rubbery polymer having an RSV of 2.8. Chlorine analysis indicated that the polymer was comprised of 88% epichlorohydrin and 22% 1,1,1-trichloro-3,4-epoxybutane.

It will be apparent to those skilled in the art that, in many cases, the monomers employed in any particular polymerization should be added in such a manner as to yield uniform copolymers, and the particular method employed will depend on the copolymerization reactivity ratio of the monomers for each system. Depending on the requirements for uniform copolymerization, the monomers can all be added at one time, at the start of the polymerization, or they can be added continuously as the polymerization proceeds. In other cases it may be found advisable to add one or more of the monomers at the beginning of the polymerization, and another monomer continuously or at intervals as the polymerization proceeds.

The above description and examples are illustrative of this invention and not in limitation thereof.

What I claim and desire to protect by Letters Patent is:

1. As a new composition of matter, a solid, linear polymer of a 1,1,1-trihalo-3,4-epoxybutane selected from the group consisting of homopolymers thereof and copolymers thereof with at least one other epoxide wherein the epoxy group is an oxirane ring, at least one of said other epoxides being a halogen-containing epoxide.

2. As a new composition of matter, a solid, linear homopolymer of a 1,1,1-trihalo-3,4-epoxybutane.

3. As a new composition of matter, a solid, linear homopolymer of 1,1,1-trichloro-3,4-epoxybutane.

4. As a new composition of matter, a linear, crystalline homopolymer of a 1,1,1-trihalo-3,4-epoxybutane having an RSV of greater than about 0.2.

5. As a new composition of matter, a linear, crystalline homopolymer of 1,1,1-trichloro-3,4-epoxybutane having an RSV of greater than about 0.2.

6. As a new composition of matter, an essentially amorphous, linear homopolymer of a 1,1,1-trihalo-3,4-epoxybutane having an RSV of greater than about 0.2.

7. As a new composition of matter, an essentially amorphous, linear homopolymer of 1,1,1-trichloro-3,4-epoxybutane having an RSV of greater than about 0.2.

8. As a new composition of matter, a solid, linear copolymer of a 1,1,1-trihalo-3,4-epoxybutane and at least one different halogen-containing epoxide wherein the epoxy group is an oxirane ring, said copolymer being comprised of, by weight, from about 3% to 98% of a 1,1,1-trihalo-3,4-epoxybutane.

9. As a new composition of matter, a solid, linear copolymer of a 1,1,1-trihalo-3,4-epoxybutane and at least one different halogen-containing epoxide wherein the epoxy group is an oxirane ring, said copolymer being comprised of, by weight, from about 20% to 95% of a 1,1,1-trihalo-3,4-epoxybutane.

10. As a new composition of matter, a solid, linear copolymer comprised of, by weight, from about 3% to 98% of a 1,1,1-trihalo-3,4-epoxybutane and from about 97% to 2% of a different halogen-containing epoxide wherein the epoxy group is an oxirane ring, said copolymer having an RSV of greater than about 0.2.

11. As a new composition of matter, a solid, linear copolymer comprised of, by weight, from about 3% to 98% of 1,1,1-trichloro-3,4-epoxybutane and from about 97% to 2% of epichlorohydrin, said copolymer having an RSV of greater than about 0.2.

References Cited by the Examiner

UNITED STATES PATENTS

| | | | |
|---|---|---|---|
| 2,870,099 | 1/1959 | Borrows et al. | 260—2 |
| 2,891,837 | 6/1959 | Campbell | 260—2 |
| 3,135,705 | 6/1964 | Vandenberg | 260—2 |

FOREIGN PATENTS 527,462  7/1956  Canada.

OTHER REFERENCES

Smith et al.: Industrial & Engineering Chem., vol. 49, pp. 1241–1246 (1957).

Colclough et al.: J. Polymer Science, 34, 178–9 (1959).

Saegusa et al.: Makromolekulare Chemie, 53, 203–5 (1962).

WILLIAM H. SHORT, *Primary Examiner.*

SAMUEL H. BLECH, *Examiner.*

T. E. PERTILLA, *Assistant Examiner.*